(12) United States Patent
Furuya et al.

(10) Patent No.: US 7,219,357 B2
(45) Date of Patent: May 15, 2007

(54) DISK APPARATUS

(75) Inventors: Hitoshi Furuya, Atsugi (JP); Shigeru Yoshino, Atsugi (JP); Takashi Sato, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 286 days.

(21) Appl. No.: 10/706,749

(22) Filed: Nov. 12, 2003

(65) Prior Publication Data
US 2004/0117811 A1 Jun. 17, 2004

(30) Foreign Application Priority Data
Dec. 16, 2002 (JP) .............................. 2002-363714

(51) Int. Cl.
*G11B 7/08* (2006.01)
*G11B 7/22* (2006.01)
(52) U.S. Cl. ...................... 720/675; 369/219; 369/249; 369/244
(58) Field of Classification Search ................ 720/675, 720/605, 662, 674; 369/249, 219, 259, 236, 369/244, 44.16; 360/266.6, 267.1, 267.2, 360/267.6, 294, 77.1
See application file for complete search history.

(56) References Cited
U.S. PATENT DOCUMENTS 4,405,262 A * 9/1983 Nagashima ................. 405/221
5,172,361 A * 12/1992 Urushibata et al. ......... 720/605
5,768,248 A * 6/1998 Lee ............................ 720/675
5,995,478 A * 11/1999 Park .......................... 720/675
6,044,057 A * 3/2000 Park et al. .................. 720/675
6,366,551 B1 * 4/2002 Wu ............................ 720/675
6,445,673 B2 * 9/2002 Park .......................... 720/675
6,567,362 B1 * 5/2003 Kagaya et al. .............. 720/675
2001/0005356 A1 6/2001 Park
2001/0012261 A1 * 8/2001 Kim et al. .................. 369/219
2002/0163870 A1 * 11/2002 Ariyoshi et al. ............ 369/75.2

FOREIGN PATENT DOCUMENTS

JP 56096182 A * 8/1981
JP 09328007 A * 12/1997
JP 11270574 A * 10/1999
JP 2001 344767 12/2001
JP 2004055026 A * 2/2004

* cited by examiner

*Primary Examiner*—Wayne Young
*Assistant Examiner*—Matthew G. Kayrish
(74) *Attorney, Agent, or Firm*—Ladas & Parry LLP

(57) ABSTRACT

A disk apparatus includes a head that reads information from a disk, a guiding rod that movably supports and guides the head, and a height adjustment portion that is rotatably formed on a base for adjusting the height of the guiding rod, wherein the height adjustment portion includes a height adjustment cam for sandwiching the guiding rod.

7 Claims, 7 Drawing Sheets

DISK APPARATUS

BACKGROUND OF THE INVENTION

1. Field of the Invention

The present invention generally relates to a head base unit, and more particularly to an optical head base unit forming a part of an optical apparatus.

2. Description of the Related Art

An optical disk apparatus has a structure including an optical head base unit. The optical head base unit has an optical head that is movably supported by a guiding rod on a base portion. The height of the guiding rod is adjustable so that the optical head can move parallel to the plane of an optical disk (e.g. CD-ROM) which disk is supported and rotated on a turntable.

FIGS. 7A, 7B, and 7C show a height adjustment mechanism of a guiding rod 20 of a conventional optical head base unit. The height adjustment mechanism is structured having a coil compression spring member 10 and an adjustment screw member 11. The coil compression spring member 10 disposed on a base plate 21 exerts a force on the guiding rod 20 upward in the direction Z1 so that the guiding rod 20 is pressed against the bottom surface of a flange 11a of the adjustment screw member 11. The adjustment screw member 11 is screwed into the base plate 21. In a case where the adjustment screw member 11 is rotated in a tightening direction with a screwdriver, the guiding rod 20 is pressed downward so that the height of the guiding rod can be adjusted to be lower. In a case where the adjustment screw member 11 is rotated in a loosening direction, the height of the guiding rod 20 can be adjusted to be higher.

Owing to the conventional height adjustment mechanism being structured by the coil compression spring member 10 and the adjustment screw member 11, the conventional height adjustment mechanism has a problem of requiring excess components and steps during assembly.

Furthermore, since the spring force of the coil compression spring member 10 is directed not only upward against the guiding rod 20, but also downward (direction Z2) against the base plate 21, creep or deformation may occur in some cases.

SUMMARY OF THE INVENTION

It is a general object of the present invention to provide a disk apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a disk apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a disk apparatus including a head that reads information from a disk; a guiding rod that movably supports and guides the head; and a height adjustment portion that is rotatably formed on a base for adjusting the height of the guiding rod, wherein the height adjustment portion includes a height adjustment cam for sandwiching the guiding rod.

Further, in the disk apparatus according to the present invention, when the height adjustment portion is rotated where the guiding rod is sandwiched by the height adjustment cam, the height of the guiding rod may be adjusted while the guiding rod is restrained by the height adjustment cam.

Further, in the disk apparatus according to the present invention, the height adjustment portion may be shaped as a circular cylinder.

Further, in the disk apparatus according to the present invention, the height adjustment portion may be formed by outsert molding.

The foregoing structure, in which the height adjustment cam sandwiches the guiding rod, requires no coil spring for applying an upward force on the guiding rod. Further, the foregoing structure, in which the height adjustment portion is rotatably formed on the base by outsert molding, requires no separate component to serve as a height adjustment member.

Further, in the disk apparatus according to the present invention, no height adjustment cam is formed at a prescribed peripheral area of the height adjustment portion.

By not forming a height adjustment cam at the prescribed peripheral area of the height adjustment portion, the guiding rod can be advanced toward and assembled to the height adjustment portion with ease.

Further, in the disk apparatus according to the present invention, the height adjustment cam may sandwich the guiding rod at an end portion of the guiding rod.

By fitting the end portion of the guiding rod (corner portion of the end portion) to the height adjustment cam, the height adjustment cam is able to sandwich the guiding rod more firmly compared to a case where the height adjustment cam sandwiches the side portion of the guiding rod.

Further, in the disk apparatus according to the present invention, the end portion of the guiding rod may have an end surface that is engaged by a bottom surface of the height adjustment cam.

By allowing the end surface of the end portion of the guiding rod to engage the bottom surface of the height adjustment cam, deviation of the guiding rod can be restricted in an axial direction thereof.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
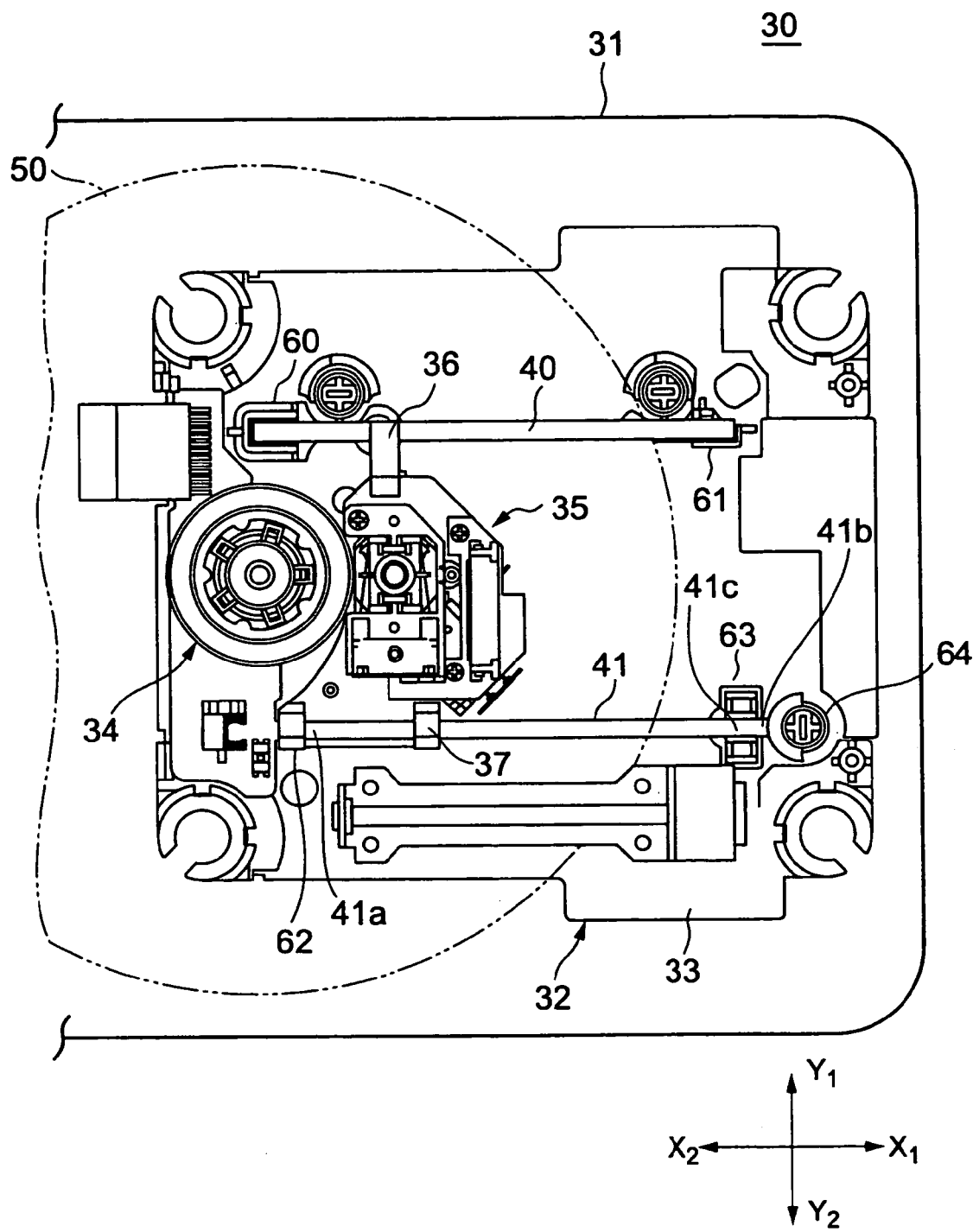
FIG. 1 is a plan view of an optical disk apparatus according to an embodiment of the present invention.

FIG. 1 is a plan view showing an optical disk apparatus 30 according to an embodiment of the present invention. The optical disk apparatus 30 has an optical head base unit 32 which is assembled to the inside of a housing 31. The optical head 30 base unit 32 includes a metal base plate 33, in which a turntable motor (not shown), a turntable 34 rotated by the turntable motor, an optical head 35, and an optical head moving mechanism (not shown) for moving the optical head 35 in directions X1–X2 are disposed on the metal base plate 33.

The metal base plate 33 has guiding rods 40 and 41 disposed thereon, in which the guiding rods 40 and 41 are situated parallel to each other in directions X1–X2.

The optical head 35 has an arm portion 36 (toward direction Y1) being supported by the guiding rod 40 and an arm portion 37 (toward direction Y2) being supported by the guiding rod 41. The optical head 35, being supported and guided by the guiding rods 40 and 41, is moved by the optical head moving mechanism (not shown) in directions X1–X2, to thereby read, for example, information from an optical disk 50 (e.g. CD-ROM) supported and rotated on the turntable 34.

Here, supporting bases 60 and 61, serving to support the corresponding end portions of the guiding rod 40, are formed to the metal base plate 33 by outsert molding. Other members also being formed to the metal base plate 33 by outsert molding are: supporting base 62 serving to support an end portion 41a (situated toward direction X2) of the guiding rod 41; a supporting base 63 serving to support an end portion 41c (situated toward direction X1) of the guiding rod 41; and a height adjustment portion 64 engaged to an end portion 41b (situated toward direction X1) of the guiding rod 41. The height adjustment portion 64 is structured as a height adjustment mechanism for the guiding rod 41.

Figure 2:
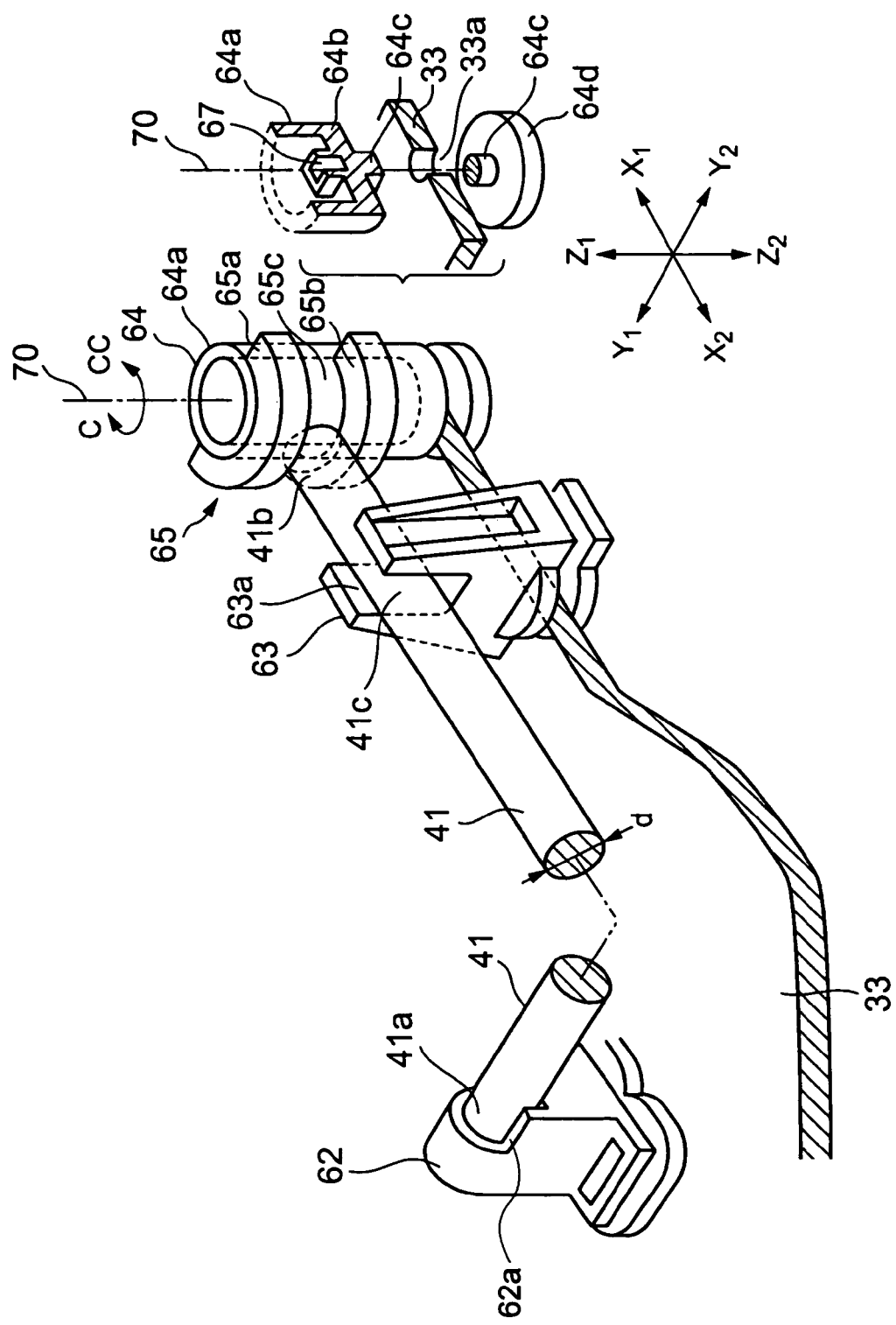
FIG. 2 is a perspective view of a height adjustment mechanism of a guiding rod shown in FIG. 1.
Figure 3A:
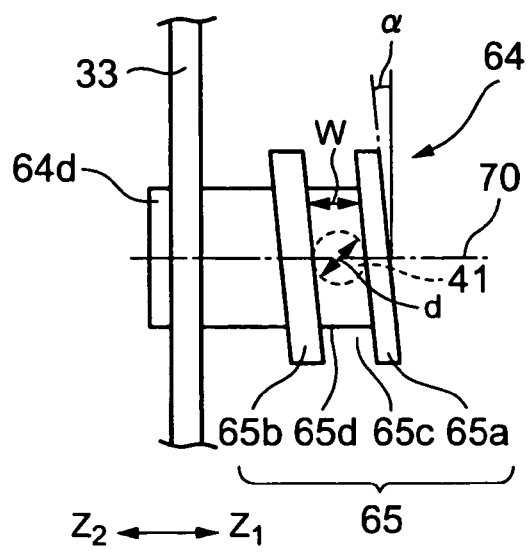
FIGS. 3A, 3B, and 3C are views of a height adjustment mechanism of a guiding rod shown in FIG. 1.
Figure 3B:
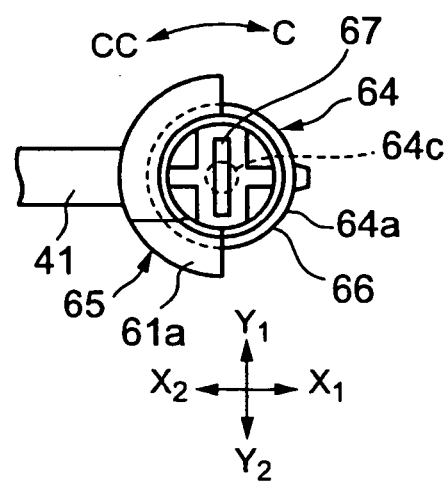
Figure 3C:
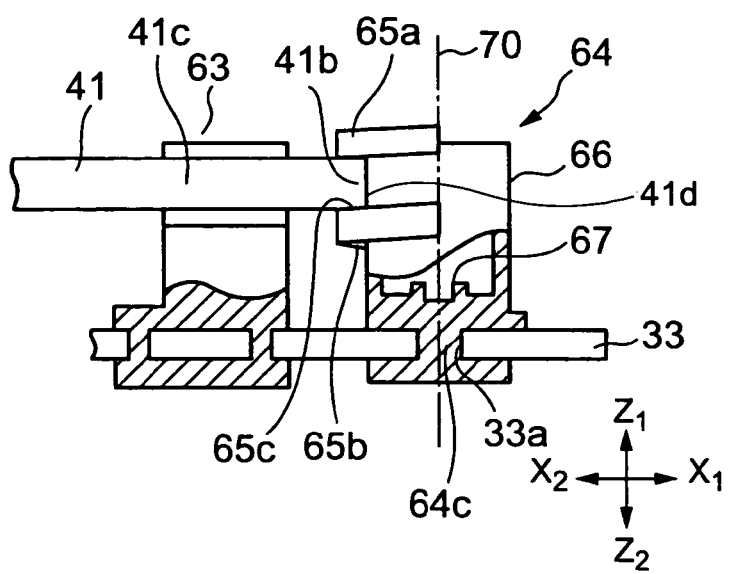

FIG. 2 shows a supporting state of the guiding rod 41. FIGS. 3A, 3B, and 3C show the height adjustment portion 64.

As shown in FIG. 2, the supporting base 62 has an opening 62a formed at a side surface thereof. The end portion 41a of the guiding rod 41 is fitted to the opening 62a to thereby define the height of the end portion 41a of the guiding rod 41a.

The supporting base 63 has a U-shaped groove portion 63a which is formed as an opening in the Z1 direction. The end portion 41c of the guiding rod 41 is fitted into the U-shaped groove portion 63a. The position of the end portion 41b of the guiding rod 41 is restricted in terms of directions Y1–Y2, but is not restricted (i.e. can be displaced) in terms of directions Z1–Z2.

As shown in FIGS. 2, 3A, 3B, and 3C, the height adjustment portion 64 is shaped as a circular cylinder. The height adjustment portion 64 includes a circular tube portion 64a, in which an opening is formed on an end (toward direction Z1) of the circular tube portion 64a. A connection portion 64c, protruding from a bottom plate portion 64b to direction Z2, penetrates through an aperture 33a of the metal base plate 33, to thereby connect with a flange portion 64d situated on a bottom surface of the metal base plate 33. The connection portion 64c is positioned on an axial line 70 of the height adjustment portion 64 and is shaped as a circular cylinder. The aperture 33a of the metal base plate 33 is shaped as a circle. The metal base plate 33 is tightly sandwiched by the bottom plate portion 64b and the flange portion 64d. Thereby, the height adjustment portion 64 will not wobble in directions Z1–Z2, will not tilt in other directions, will be able to stand firmly and perpendicularly on the metal base plate 33, and thus, will be able to rotate around the axial line 70. Furthermore, the height adjustment portion 64 is formed to rotate tightly and is unable to freely rotate in either direction from its set rotated position. Furthermore, the height adjustment portion 64 is disposed in a manner facing the end portion 41b (situated toward direction X1) of the guiding rod 41.

A height adjustment cam 65 is formed-on the side cylindrical surface partly surrounding the circular tube portion 64a. As shown in FIG. 3A, the height adjustment cam 65 includes: an upper flange portion 65a and a lower flange portion 65b which are disposed as two stages situated one on top of the other and slightly tilted a degrees with respect to the horizontal plane (X-Y plane); and a groove portion 65c which is disposed between the upper flange portion 65a and the lower flange portion 65b in a tilted manner (due to the angle α). The upper flange portion 65a, the lower flange portion 65b, and the groove portion 65c are structured to form a part of an inclination. Numeral 65d indicates a bottom surface of the groove portion 65c. In the height adjustment cam 65, the width W of the groove portion 65c is equal to or slightly less than the diameter d of the guiding rod 41. Furthermore, the upper flange portion 65a and the lower flange portion 65b are disposed in the same peripheral area and thus are formed to surround the circular tube portion 64a approximately 180 degrees. Furthermore, the circular tube portion 64a has a peripheral side surface portion 66 situated on the opposite side of the height adjustment cam 65 with respect to the diameter direction of the circular tube portion 64a. Furthermore, a groove 67 is formed on a top surface of the bottom plate portion 64b so that the tip of a screwdriver may be fitted thereto.

Figure 5:
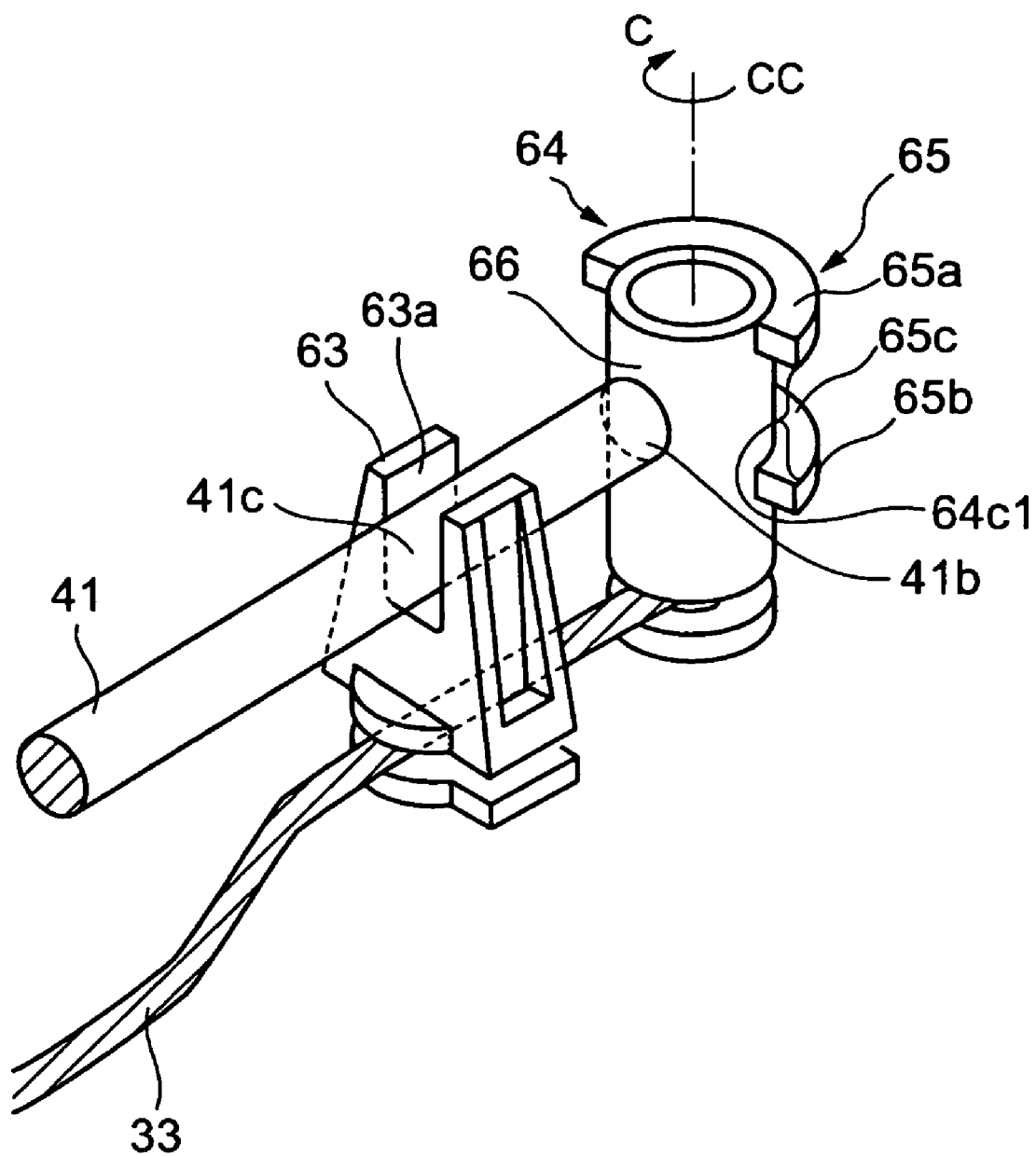
FIG. 5 is a perspective view showing a guiding rod in a set state.

As shown in FIG. 5, the peripheral side surface portion 66 is rotated to a position facing the supporting base 63.

The height adjustment portion 64 is operated in a manner described below.

The guiding rod 41 is set (assembled) in a manner shown in FIG. 5, in which the end portion 41a (situated toward direction X2) of the guiding rod 41 is fitted to the opening 62a of the supporting base 62, and a portion proximate to the end portion 41b (situated toward direction X1) of the guiding rod 41 is fitted to the U-shaped groove portion 63a of the supporting base 63. Since the height adjustment cam 65 is formed in a manner surrounding only a portion of the circular tube portion 64a, the height adjustment cam 65 will not obstruct during the procedure of fitting the guiding rod 41. Accordingly, the procedure of setting (assembling) the guiding rod 41 can be performed easily.

Next, the screwdriver (not shown) is inserted into the circular tube portion 64a; then, the tip of the screwdriver is fitted into the groove 67; and then, the screwdriver is rotated approximately half ways; thereby rotating the height adjustment portion 64. In the midst of rotating the height adjustment portion 64, the end portion 41b (situated toward direction X1) of the guiding rod 41 is fitted to the groove portion 65c. Accordingly, the end portion 41b of the guiding rod 41, being tightly sandwiched between the upper flange portion 65a and the lower flange portion 65b, can be fitted to the height adjustment cam 65, so as to thereby restrict positioning in directions Z1–Z2.

Figure 6A:
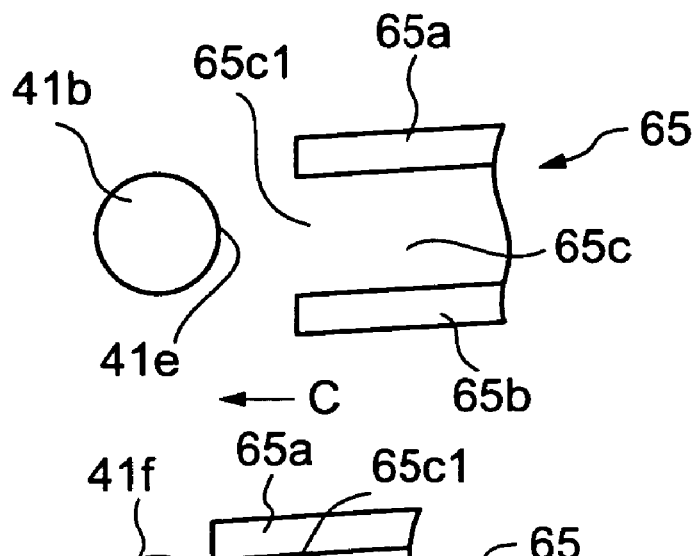
FIGS. 6A, 6B, and 6C are views for showing a guiding rod being engaged by a height adjustment cam.
Figure 6B:
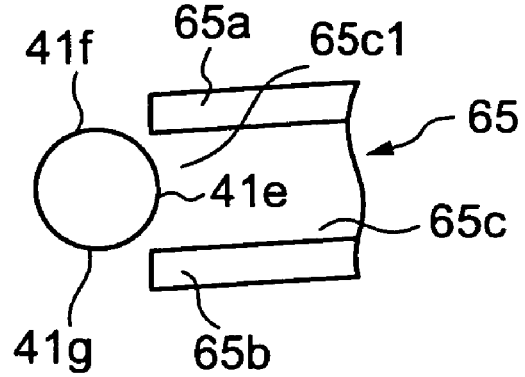
Figure 6C:
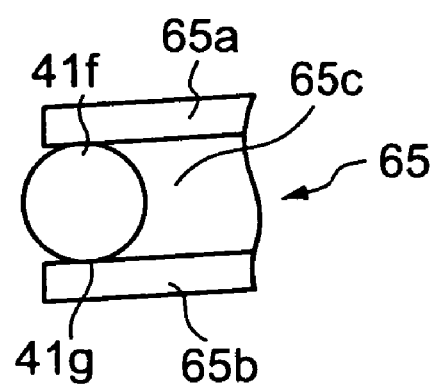
Figure 7A:
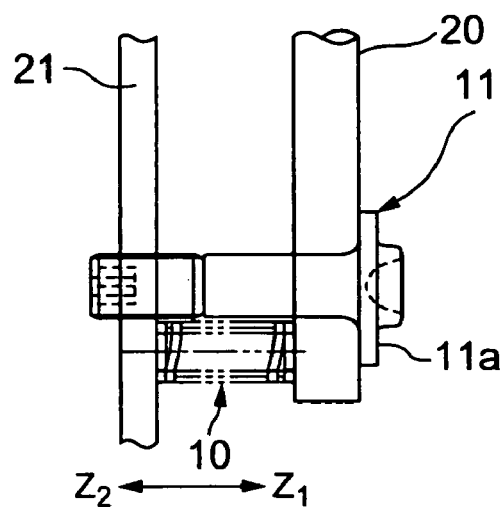
FIGS. 7A, 7B, and 7C are views showing a height adjustment mechanism for a conventional guiding rod.
Figure 7B:
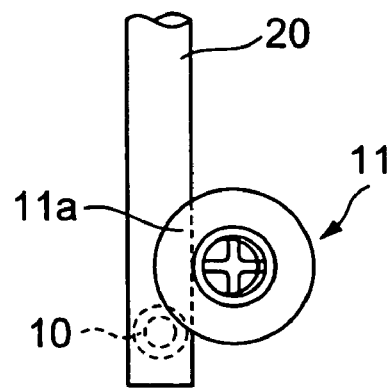
Figure 7C:
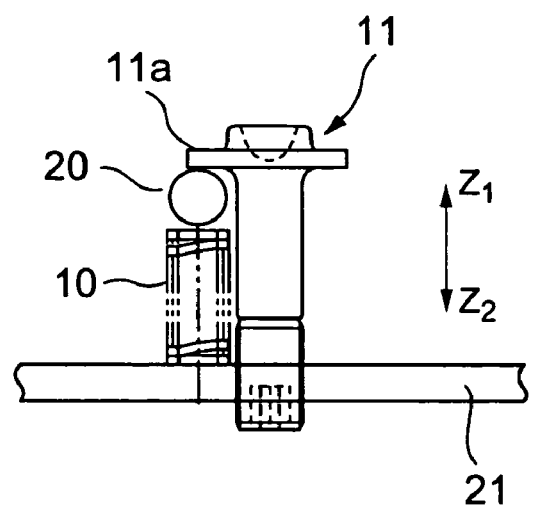

A procedure of fitting the groove portion 65c to the end portion 41b of the guiding rod 41 is described below with reference to FIGS. 6A, 6B, and 6C. FIGS. 6A, 6B, and 6C show a state of engaging the height adjustment cam 65 of the height adjustment portion 64 to the end portion 41b of the guiding rod 41 when viewed from an axial direction (direction X1) of the guiding rod 41. With reference to FIGS. 6A, 6B, and 6C, as the height adjustment portion 64 is rotated, an entrance portion 65c1 of the groove portion 65c is drawn closer to an arc portion 41e of the guiding rod 41, and is thus fitted to the guiding rod 41. Hence, the arc portion 41e of the guiding rod 41 serves as a guide for smoothly fitting the groove portion 65c to the guiding rod 41.

Figure 4:
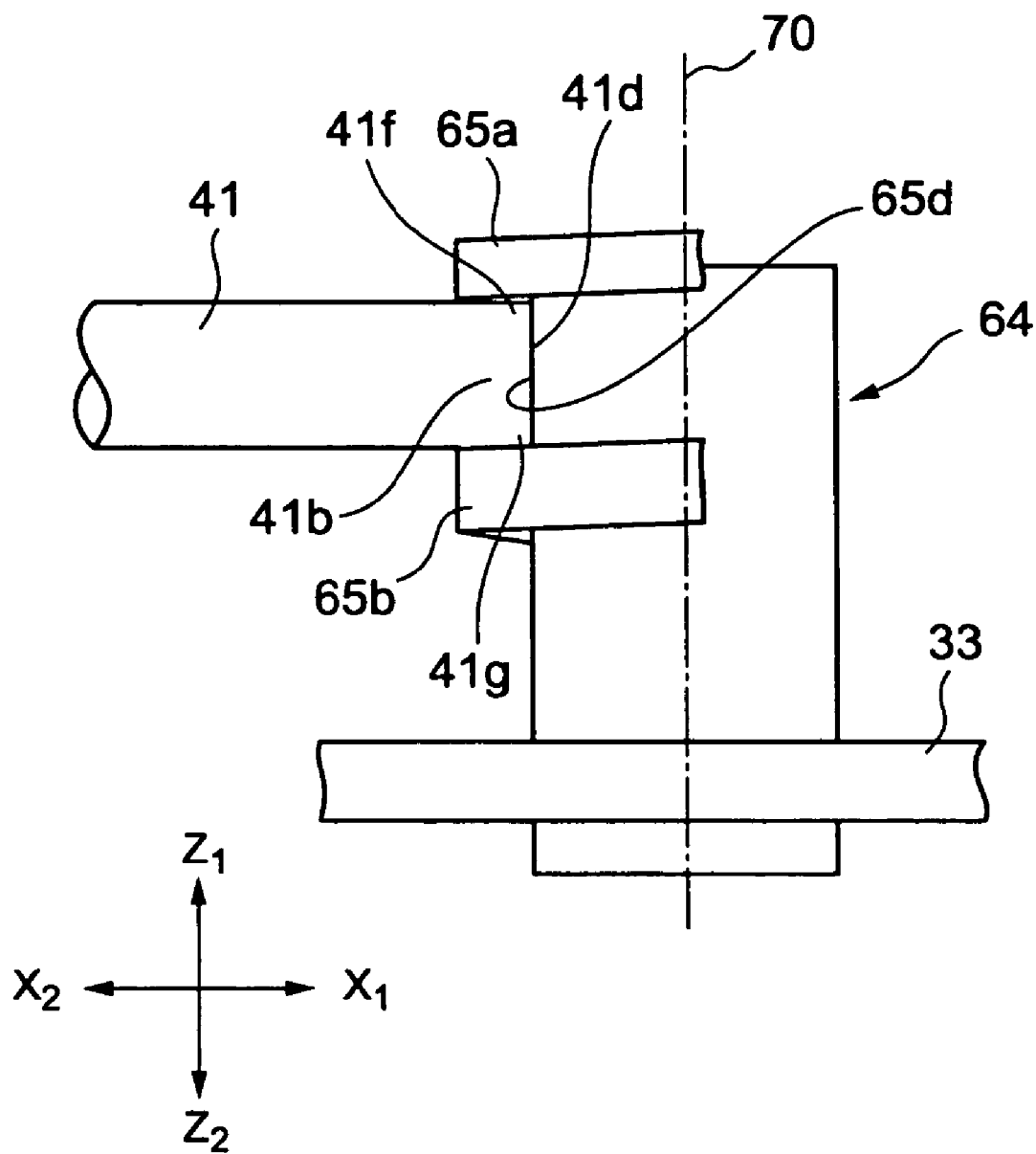
FIG. 4 is an enlarged view showing part of FIG. 3C.

In the state where the groove portion 65c is fitted to the guiding rod 41, corner portions 41f, 41g of an end surface 41d of the end portion 41b are engaged by the upper flange portion 65a and lower flange portion 65b, respectively, in a manner shown in enlarged view FIG. 4. Therefore, the height adjustment cam 65 firmly restricts the height of the end portion 41b of the guiding rod 41.

When the height adjustment portion 64 is rotated in a clockwise direction (illustrated with arrow C in FIG. 5 and/or FIG. 3B) with use of a screwdriver, the end portion 41b of the guiding rod 41 is displaced toward direction Z1. When the height adjustment portion 64 is rotated in a counter-clockwise direction (illustrated with arrow CC in FIG. 5 and/or FIG. 3B), the end portion 41b of the guiding rod 41 is displaced toward direction Z2. Accordingly, the end portion 41b is displaced (where the end portion 41a is the center) in directions Z1–Z2 while the portion proximate to the end portion 41b is guided by the supporting base 63, to thereby enable adjustment of the height of the guiding rod 41.

After the screwdriver is withdrawn, the position of the height adjustment portion 64 is reliably set, and the height of the end portion 41b of the guiding rod 41 is restricted by the upper flange portion 65a and the lower flange portion 65b, to thereby secure the guiding rod 41 at the adjusted height.

It is to be noted that the procedure using the screwdriver is performed based on data obtained by mounting an adjustment test optical disk on the turntable 34 of the optical disk apparatus 30 and reading the adjustment test optical disk by moving the optical head 35 along the guiding rods 40 and 41.

As shown in FIG. 3C, the end surface 41d of the end portion 41b (situated toward direction X1) of the guiding rod 41 makes contact with the bottom surface 65d of the groove portion 65c, to thereby restrain the creation of skew in the axial direction (direction X1).

It is to be noted that the height adjustment mechanism of the guiding rod 41 may be applied not to the guiding rods for guiding the optical head 35, but to a guiding rod for guiding a moving magnetic head.

In consequence, the present invention provides a disk apparatus including a head that reads information from a disk; a guiding rod that movably supports and guides the head; and a height adjustment portion that is rotatably formed on a base for adjusting the height of the guiding rod, wherein the height adjustment portion includes a height adjustment cam for sandwiching the guiding rod. Further, in the disk apparatus according to the present invention, when the height adjustment portion is rotated where the guiding rod is sandwiched by the height adjustment cam, the height of the guiding rod may be adjusted while the guiding rod is restrained by the height adjustment cam. Further, in the disk apparatus according to the present invention, the height adjustment portion may be shaped as a circular cylinder.

Further, in the disk apparatus according to the present invention, the height adjustment portion may be formed by outsert molding. Therefore, the foregoing structure, in which the height adjustment cam sandwiches the guiding rod, requires no coil spring for applying an upward force to the guiding rod. Further, the foregoing structure, in which the height adjustment portion is rotatably formed on the base by outsert molding, requires no separate component to serve as a height adjustment member. Therefore, the number of required components can be reduced in comparison to the conventional disk apparatus, and the procedures of assembling a coil spring and screwing in a height adjustment member can be eliminated. Accordingly, efficiency in assembly can be improved, and risk of creep or deformation can be eliminated since no coil spring is required for assembly.

Further, the present invention is not limited to these embodiments, but various variations and modifications may be made without departing from the scope of the present invention.

The present application is based on Japanese Priority Application No.2002-363714 filed on Dec. 16, 2002, with the Japanese Patent Office, the entire contents of which are hereby incorporated by reference.

What is claimed is:

1. A disk apparatus comprising:
   a head that reads information from a disk;
   a guiding rod that movably supports and guides the head; and
   a height adjustment portion that is rotatably formed on a base for adjusting the height of the guiding rod,
   wherein the height adjustment portion includes a height adjustment earn for sandwiching the guiding rod;
   wherein the height adjustment cam includes first and second flange portions, wherein the distance between the first and second flange portions is constant; and
   wherein the first and second flange portions partly encompass the height adjustment portion in a circumferential direction of the height adjustment portion; and
   wherein a part of the height adjustment portion not encompassed by the first and second flange portions, defines a partial circumferenual gap in the first and second flange portions through which the guiding rod is moveable in the direction of the axis of rotation of the height adjustment portion.

2. The disk apparatus as claimed in claim 1, wherein when the height adjustment portion is rotated where the guiding rod is sandwiched by the height adjustment cam, the height of the guiding rod is adjusted while the guiding rod is restrained by the height adjustment cam.

3. The disk apparatus as claimed in claim 1, wherein the height adjustment portion is shaped as a circular cylinder.

4. The disk apparatus as claimed in claim 1, wherein the height adjustment portion is formed by outsert molding.

5. The disk apparatus as claimed in claim 1, wherein no height adjustment cam is formed at a prescribed peripheral area of the height adjustment portion.

6. The disk apparatus as claimed in claim 1, wherein the height adjustment cam sandwiches the guiding rod at an end portion of the guiding rod.

7. The disk apparatus as claimed in claim 6, wherein the end portion of the guiding rod has an end surface that is engaged to a bottom surface of the height adjustment cam.

* * * * *